(12) United States Patent
Kummailil et al.

(10) Patent No.: US 9,992,489 B2
(45) Date of Patent: *Jun. 5, 2018

(54) IMAGE SENSOR CALIBRATION

(71) Applicant: Boston Scientific Scimed, Inc., Maple Grove, MN (US)

(72) Inventors: John Kummailil, Sherborn, MA (US); Nathaniel McCaffrey, Hampton Falls, NH (US)

(73) Assignee: Boston Scientific Scimed, Inc., Maple Grove, MN (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/369,535

(22) Filed: Dec. 5, 2016

(65) Prior Publication Data

US 2017/0085870 A1    Mar. 23, 2017

Related U.S. Application Data

(63) Continuation of application No. 14/192,342, filed on Feb. 27, 2014, now Pat. No. 9,544,582.

(Continued)

(51) Int. Cl.
*H04N 5/357* (2011.01)
*H04N 17/00* (2006.01)
(Continued)

(52) U.S. Cl.
CPC ....... *H04N 17/002* (2013.01); *G02B 23/2484* (2013.01); *H04N 5/357* (2013.01); *H04N 2005/2255* (2013.01)

(58) Field of Classification Search
CPC .. C08G 69/44; G02B 23/2484; H04N 17/002; H04N 2005/2255; H04N 5/357; Y10S 525/934; Y10T 428/24826; Y10T 428/24843; Y10T 428/24851; Y10T 428/24893; Y10T 442/2746
(Continued)

(56) References Cited

U.S. PATENT DOCUMENTS 5,757,425 A * 5/1998 Barton ................. H04N 5/3655
                                                                                   250/205
6,078,683 A * 6/2000 Denison ............... G06K 9/3283
                                                                                   209/534
(Continued)

OTHER PUBLICATIONS

Thompson et al, A dual processing system for PET data handling, Feb. 1983.*

*Primary Examiner* — Shan E Elahi
(74) *Attorney, Agent, or Firm* — Bookoff McAndrews, PLLC

(57) ABSTRACT

A method of calibrating an image sensor may include detecting a response from a pixel of the image sensor as a result of light having an intensity impinging on the pixel, and measuring the actual standard deviation of the response of the pixel at the intensity of light. The method may also include determining an averaging number for the pixel at the intensity. The averaging number may be a number of responses of the pixel at the intensity to be averaged to attain an average response having a standard deviation less than or equal to a target value. The method may further include determining the average response of the pixel using the determined averaging number.

19 Claims, 3 Drawing Sheets

Related U.S. Application Data

(60) Provisional application No. 61/771,550, filed on Mar. 1, 2013.

(51) Int. Cl.
*G02B 23/24* (2006.01)
*H04N 5/225* (2006.01)

(58) Field of Classification Search
USPC .......................................................... 348/65
See application file for complete search history.

(56) References Cited

U.S. PATENT DOCUMENTS

| | | | |
|---|---|---|---|
| 6,234,294 B1* | 5/2001 | Defeo | G07D 7/12 194/207 |
| 6,430,313 B1* | 8/2002 | Smith | H04N 9/045 382/162 |
| 6,836,288 B1 | 12/2004 | Lewis | |
| 2004/0140981 A1 | 7/2004 | Clark | |
| 2004/0140982 A1 | 7/2004 | Pate | |
| 2004/0169747 A1 | 9/2004 | Ono et al. | |
| 2005/0065406 A1* | 3/2005 | Cline | A61B 1/00009 600/160 |
| 2006/0152607 A1* | 7/2006 | Noguchi | H04N 5/238 348/248 |
| 2006/0164533 A1* | 7/2006 | Hsieh | H01L 27/14632 348/317 |
| 2006/0292647 A1* | 12/2006 | Green | G01N 33/56911 435/7.32 |
| 2007/0016079 A1 | 1/2007 | Freeman et al. | |
| 2007/0104472 A1* | 5/2007 | Quan | G03B 7/08 396/79 |
| 2007/0150198 A1 | 6/2007 | MacDonald | |
| 2007/0232930 A1 | 10/2007 | Freeman et al. | |
| 2007/0249913 A1 | 10/2007 | Freeman et al. | |
| 2010/0112469 A1* | 5/2010 | Miyaharu | G03B 27/54 430/30 |
| 2010/0245552 A1 | 9/2010 | Higuchi | |
| 2010/0272318 A1* | 10/2010 | Cabiri | A61B 1/00096 382/106 |
| 2011/0134268 A1 | 6/2011 | MacDonald | |
| 2012/0226130 A1 | 9/2012 | De Graff et al. | |
| 2012/0253122 A1* | 10/2012 | Minetoma | A61B 1/00057 600/109 |
| 2013/0137949 A1 | 5/2013 | Freeman et al. | |
| 2013/0245455 A1 | 9/2013 | Freeman et al. | |
| 2013/0316487 A1 | 11/2013 | De Graff et al. | |

\* cited by examiner

IMAGE SENSOR CALIBRATION

CROSS-REFERENCE TO RELATED APPLICATIONS

This application is a Continuation Application of U.S. patent application Ser. No. 14/192,342, filed Feb. 27, 2014, which claims the benefit of priority from U.S. Provisional Application No. 61/771,550, filed on Mar. 1, 2013, all of which are incorporated by reference herein in their entireties.

TECHNICAL FIELD

Embodiments of the invention relate generally to systems and methods of calibrating an image sensor of a device, and image sensors and devices that employ the calibration technique.

BACKGROUND

An image sensor is a device that converts an optical image into an electronic signal. Image sensors are used in imaging devices, such as, for example, digital cameras to capture an optical image. Commonly used image sensors include digital charge-coupled device (CCD) or complementary metal oxide semiconductor (CMOS) active pixel sensors. These image sensors generate a flow of electrons (which manifests as current, voltage, etc.) that is indicative of the intensity of light that impinges on the sensor. Based on the response (current, voltage, or other indicator) of the image sensor, the amount of light incident on the sensor can be measured. An image sensor includes an array of individual pixels that are arranged thereon. Each of these pixels respond differently to incident light, due to manufacturing variations (e.g., semiconductor processing variation) and random or "shot" noise. The response of each pixel also fluctuates as a function of the intensity of the light that falls on the pixel due to noise. The manufacturing related variations in light response of pixels manifests as spatial variations in the response of an image sensor, and the intensity related variations manifests as temporal variations in the response of an image sensor. The spatial and temporal variation in the response of an image sensor is undesirable in imaging applications. Although calibration techniques can be applied to correct the spatial variations in light response of an image sensor, known calibration techniques do not adequately account for the temporal variations in the image sensor. Consequently, for some applications, calibration techniques used to correct the light response of an image sensor can be unacceptably inaccurate. The systems and methods of the present disclosure may help address the foregoing problems and/or other problems existing in the art.

SUMMARY

In one embodiment, a method of calibrating an image sensor is disclosed. The method may include detecting a response from a pixel of the image sensor as a result of light having an intensity impinging on the pixel, and measuring the actual standard deviation of the response of the pixel at the intensity of light. The method may also include determining an averaging number for the pixel at the intensity. The averaging number may be a number of responses of the pixel at the intensity to be averaged to attain an average response having a standard deviation less than or equal to a target value. The method may further include determining the average response of the pixel using the determined averaging number.

Various embodiments of the invention may include one or more of the following aspects: receiving the actual standard deviation may include determining the actual standard deviation of the response of the pixel at multiple intensities of incident light and recording the determined actual standard deviations; determining the actual standard deviation may include determining the actual standard deviation for multiple pixels of the image sensor at multiple intensities of incident light and recording the determined actual standard deviations; determining the averaging number may include determining an averaging number for each of the multiple pixels, the averaging number for each pixel of the multiple pixels maybe the number of the responses of the pixel to be averaged to attain an average response for the pixel at the intensity of light incident on the pixel; determining the averaging number may include determining the averaging number using the equation $n=\text{ceil}[(\sigma_{actual}/\sigma_{target})^2]$, where n=the averaging number, $\sigma_{actual}$=the actual standard deviation of all pixels at the intensity, $\sigma_{target}$=the target value of standard deviation, and ceil is a ceiling function that rounds a result of $(\sigma_{actual}/\sigma_{target})^2$ to the next integer greater than or equal to the result.

Various embodiments of the invention may also include one or more of the following aspects: determining the averaging number may include rounding the determined averaging number to the closest higher power of two; the rounding may include rounding the determined averaging number using the equation $n^*=2$ to the power of (ceil[$\log_2(n)$]), where $n^*$=the averaging number rounded to the closest higher power of two, n=the determined averaging number, and ceil is a ceiling function that rounds a result of the calculation to the next integer greater than or equal to the result; the target value of standard deviation may be the actual standard deviation of a pixel of the image sensor having a lowest value of response; and the target value of standard deviation maybe 1 DN.

In another embodiment, a control system for an image sensor is disclosed. The control system may include an image sensor including a plurality of pixels arranged thereon. Each pixel of the plurality of pixels being configured to output a response indicative of an intensity of light incident thereon. The control system may also include a memory including a database. The database may include an averaging number for at least one pixel of the plurality of pixels at multiple intensities. The averaging number may be indicative of a number of responses of the pixel at an be averaged to attain an average response having a standard deviation less than or equal to a target value. The control system may also include a processor operatively coupled to the image sensor and the memory. The processor may be configured to determine the average response of the pixel based on the determined averaging number and the intensity of light incident on the pixel.

Various embodiments of the control system may include one or more of the following aspects: wherein the database may include the averaging number for each of multiple pixels of the plurality of pixels; the processor may be configured to determine the averaging number for the multiple pixels, the averaging number for each pixel of the multiple pixels may be the number of the responses of the pixel to be averaged to attain an average response for the pixel at the intensity of light incident on the pixel; the database may include the averaging number obtained using the equation $n=\text{ceil}[(\sigma_{actual}/\sigma_{target})]$, where n=the averaging number, $\sigma_{actual}$=the actual standard deviation of all pixels at the intensity, $\sigma_{target}$=the target value of standard deviation, and ceil is a ceiling function that rounds a result of $(\sigma_{actual}/(\sigma_{target})^2$ to the next integer greater than or equal to the result; the database may include the averaging number rounded to the closest higher power of two; and the control system may further include an endoscope coupled to the image sensor.

In a further embodiment, a method operating an image sensor is disclosed. The method may include detecting a response from a pixel of the image sensor as a result of light having a first intensity impinging on the pixel. The method may also include obtaining an actual standard deviation of the response of the pixel at the first intensity. The actual standard deviation may be a number indicative of an expected variation in the response of the pixel. The method may also include determining a number n at the first intensity, wherein the number n is the number of frames at the first intensity to be averaged to attain a target standard deviation for the response at the first intensity. The method may further include averaging n number of responses from the pixel at the first intensity to obtain an average response from the pixel at the first intensity.

Various embodiments of the method may include one or more of the following aspects: obtaining the actual standard deviation may include receiving the actual standard deviation from a memory operatively coupled to the image sensor; determining the number n may use a processor operatively coupled to the image sensor; and detecting the response may include detecting the response from the image sensor of an endoscope.

DETAILED DESCRIPTION

The systems and methods disclosed herein can be applied to an image sensor used in any application. However, as one exemplary application the discussion that follows, an image sensor applied in an endoscopic application is described.

Figure 1:
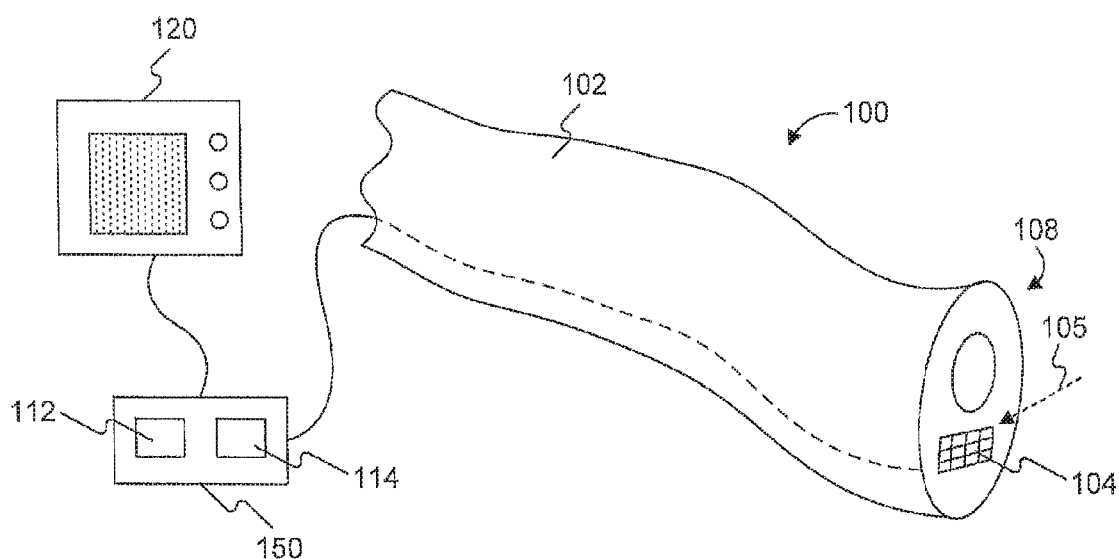
FIG. 1 is a schematic diagram of an endoscope including an image detector, according to an embodiment of the invention.

FIG. 1 is a schematic diagram that illustrates an exemplary endoscope 100 including an exemplary image sensor 104 coupled to the distal end 108 of an elongate body 102. The image sensor 104 may be any type of image sensor, such as for example, CCD, CMOS, etc., known in the art. Image sensor 104 may generate a signal indicative of the intensity of light 105 (or another type of electromagnetic radiation) that impinges thereon. Image sensor 104 may include one or more image detecting elements ("pixels") arranged in any pattern thereon. In use, the distal end 108 of the endoscope 100 may be inserted into a human body and positioned proximate a work site (such as, for example, an ulcer) within the body. Thus positioned, image sensor 104 may be adapted to acquire an image of the work site. This image may be transmitted and displayed on an image device 120 positioned outside the body. Endoscope 100 may also include a control system 150 configured to control the operation of the image sensor 104. In some embodiments, control system 150 may be integrated with a control system that controls other operations of the endoscope 100. Control system 150 may include, among other components, a processor 112 configured to perform image processing applications and a memory 114 configured to store a database of values. Although control system 150, memory 114, and processor 112 are illustrated as being separate from endoscope 100, in some embodiments, some or all of these components may be integrated. Further, although the display device 120 and control system 150 are illustrated as being coupled to image sensor 104 using a wire, this is only exemplary. In some embodiments, display device 120 and/or control system 150 may be wirelessly coupled to the image sensor 104. Image sensor 104 may include an array of pixels arranged in a pattern.

Figure 2:
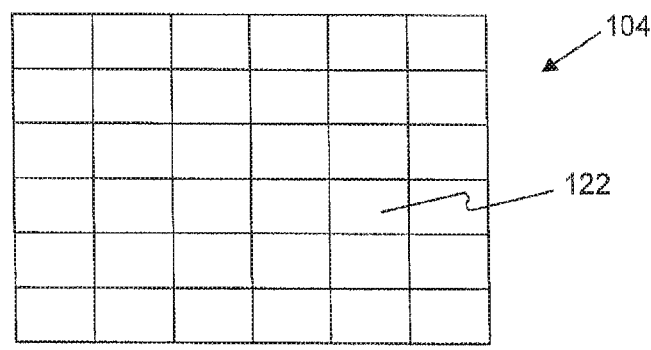
FIG. 2 is a schematic of an exemplary image sensor of the endoscope of FIG. 1.

FIG. 2 is a schematic illustration an exemplary array of pixels 122 in image sensor 104 of endoscope 100. Although a 2-dimensional array of pixels 122 arranged in a planar configuration is illustrated in FIG. 2, this is only exemplary. In some embodiments, the pixels 122 of an image sensor 104 may be arranged in another configuration (for example, a one-dimensional array arranged on a curved surface). Each pixel 122 of the image sensor 104 may generate a signal that is indicative of the intensity of the light impinging on that particular pixel. The signal may be an analog or a digital signal. In some embodiments, the image sensor 104 may include electronics (such as an A/D converter) that outputs a digital number (DN) that is indicative of the intensity of the light incident on pixel 122. The magnitude of the digital number may depend upon the type of image sensor 104 and/or the included electronics. For example, image sensors 104 and/or related electronics based on 8 bit integrated circuit devices may output digital numbers varying from $2^0$ (1) to $2^8$ (256) in response to light that is incident thereon. In such embodiments, the magnitude of the DN that is output by pixel 122 may vary proportionately as a function of the intensity of light incident on the pixel 122.

In some embodiments, the image sensor 104 may be referred to as a pixel array, a multidimensional pixel array, a pixel matrix, or an imager. Although not shown, the image sensor 104 may include devices (for example, for separating and/or detecting different spectral regions of light) such as a Bayer sensor, a dichroic prism, etc, that may be commonly used with image sensors. The spectral region of light, in some embodiments, may be a continuous or a discontinuous (e.g., periodic, irregular) band of wavelengths centered around a specific wavelength. For example, the band of wavelengths can be centered around a visible color wavelength such as a red wavelength or a green wavelength.

The pixels of image sensor 104 may be configured to be individually calibrated to account for variations in the response of each pixel to incident light 105. A pixel can be calibrated by calculating one or more calibration factors that may be used to modify the response of the pixel to match a target response. The calibration factor can be used to adjust a response of a pixel such that the response corresponds with a target response at a specified intensity of light 105 incident on the pixel. The response of a pixel (or an image sensor) to a range of light intensities is referred to as responsivity. The responsivity of a pixel may be expressed as a curve that plots the variation of the pixel response as a function of light intensity. In general, the responsivity may be linear or non-linear, hi some embodiments, different calibration factors can be calculated for pixels that have different response characteristics (e.g., different inherent response characteristics) over a range of intensity values of incident light 105. In other words, one or more calibration factors can be calculated for one or more pixels from an image sensor to account for spatial variations across the image sensor.

In some embodiments, a calibration factor associated with a pixel can be calculated using a calibration algorithm such as a single-point calibration algorithm or a multi-point calibration algorithm (i.e., calibration based on two or more calibration points). For convenience, the embodiments described in this detailed description focus on a two-point calibration algorithm, but the methods and apparatus described herein can be applied to different calibration algorithms such as a three-point calibration algorithm. In a two-point calibration algorithm, two sets of pixel-response values of a pixel that are respectively associated with two different intensity values are used to define a linear response-intensity relationship. The number (e.g., one or more) of pixel-response values in each set is referred to herein as the data point number. In some embodiments, the data point number may be referred to as a calibration number or a frame number, and has integer values such as, for example, 1, 2, 3, 4, 8, 12, 16, etc. The response-intensity relationship can be representative of the response of the pixel over a range of intensity values associated with the two different intensity values. A correction or a calibration factor can be calculated based on a difference(s) between the response-intensity relationship and a target response-intensity relationship such that a pixel-response value modified based on the calibration factor will substantially correspond to the target response-intensity relationship. In some embodiments, each set of pixel-response value can have different numbers of pixel-response values as defined by the data point numbers.

To increase the probability that a response-intensity relationship will be a substantially accurate model of the responsivity of a pixel, the number of data points in the sets of pixel-response values can be calculated based on a statistical threshold condition(s) (e.g., a standard-deviation condition(s), a standard-deviation limit/value(s), or a confidence interval condition(s)). The statistical threshold limit can be defined such that one or more data point numbers can be calculated and used in a two-point calibration algorithm to modify (e.g., increase or decrease) the confidence that a calibration factor calculated using the two-point calibration algorithm can substantially account for differences between a response-intensity relationship associated with pixel and a target response-intensity relationship.

In some embodiments, the data point number can be calculated such that a response-intensity relationship defined based on the data point number will have a specified probability of representing an inherent response-intensity relationship of a pixel (e.g., response-intensity relationship without temporal noise). In some embodiments, one or more data point numbers can be calculated to increase or decrease the probability that a response-intensity relationship defined based on the data point number in a two-point calibration algorithm will be representative of an inherent response-intensity relationship of a pixel. In some embodiments, the data point number(s) may be selected to decrease the influence of scatter (e.g., statistical outliers) in the calibration algorithm. The scatter or distribution of pixel-response values can be caused by, for example, temporal noise or noise associated with instruments used to acquire the pixel-response values at the calibration points of the two-point calibration.

In some embodiments, the processor 112 of endoscope 100 may be configured to calculate a response-intensity relationship(s) and/or a calibration factor(s) associated with the image sensor 104. The processor 112 may be operatively coupled and configured to access the memory 114. The memory 114 may be configured to store the calibration factor(s) and/or a target response-intensity relationship used to calculate the calibration factor(s). The memory 114 can also be configured to store instructions that can be accessed by and/or executed by the processor 112. In some embodiments, the instructions can be configured to trigger the processor 112 to use one or more calibration factors to modify a responsivity of the image sensor 104.

Figure 3:
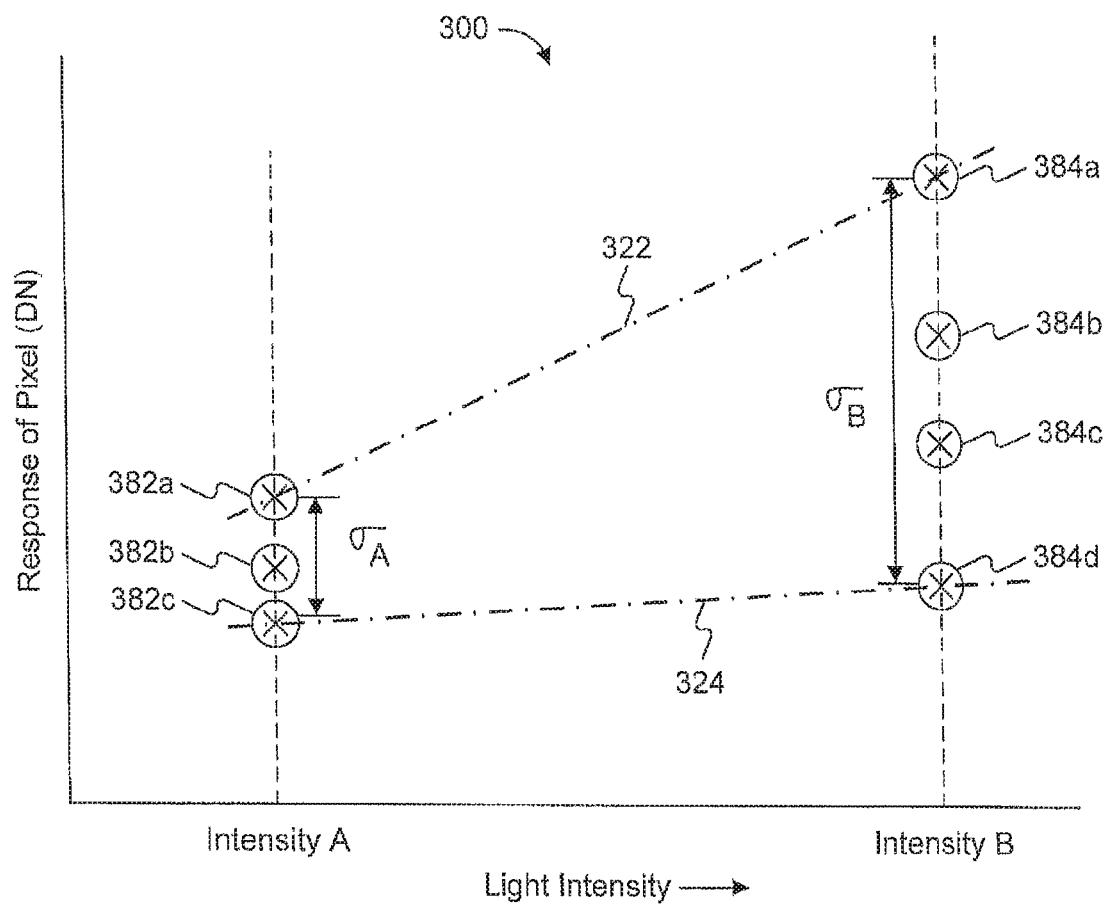
FIG. 3 is a schematic graph that illustrates the responsivity of an exemplary pixel of the image sensor of FIG.

FIG. 3 is an exemplary graph 300 illustrating the responsivity of pixel 122 of image sensor 104. The x-axis of graph 300 indicates the intensity of light 105 impinging on the pixel 122, and they-axis of graph 300 indicates the response of the pixel 122 (in digital number, DN) at the different light intensities. The x-axis of graph 300 also identifies two light intensities (marked "intensity A" and "intensity B"), at which frames of images may be acquired to calculate calibration factors to minimize the temporal variation of the response of pixel 122. The light intensities at intensity A and intensity B may be any value. In the discussion that follows, the intensity of light at the intensity A is assumed to be lower than the intensity of light at intensity B. Several frames of images (that is, data point numbers) may be acquired using image sensor 104 at intensities A and B. Points 382a, 382b, 382c represent the response of pixel. 122 (in DN) corresponding to frames at intensity A, and points 384a, 384b, 384c, and 384d represent the response of pixel 122 corresponding to frames at intensity B. As illustrated in graph 300, the standard deviation or the scatter of the response, $\sigma_A$, at intensity A is lower than the standard deviation $\sigma_B$ of the response at intensity B. This trend in the standard deviation is observed because noise is known to be proportional to the intensity of the illumination. That is, the noise associated with a brighter image is known to be larger than noise associated with a darker image. In some embodiments, linear regression (or another suitable procedure) may be used to approximate the response of the pixel 122 at intensities between intensity A and intensity B. Lines 322 and 324 of graph 300 illustrate the upper and lower bounds of the response at different intensities between intensity A and intensity B. That is, a responsivity relationship derived based on two random intensities (intensity A and intensity B) may fall anywhere within the upper bound 322 and lower bound 324.

It is known that noise at an illumination level can be reduced by averaging several frames taken at the illumination level. The larger the number of frames that are averaged, the lower is the noise. That is, by averaging the response of the pixel 122 from several frames taken at an illumination level, the error associated with noise (or temporal variation) at that illumination level may be minimized. Therefore, by averaging several frames taken at intensity A, an average value of the response with minimal noise may be obtained. Similarly, averaging several frames taken at intensity B, an average value of the response at intensity B with minimal noise may be obtained. However, since the inherent standard deviation of the response at high intensities is greater than that at low intensities (that is, $\sigma B > \sigma_A$), a larger number of frames will have to be averaged at the intensity B than at intensity A for comparable noise reduction. In embodiments where averaging a certain number of frames (for example, three frames) at intensity A reduces $\sigma_A$ by an acceptable amount, averaging the number of frames at the second calibration intensity may not reduce $\sigma_B$ sufficiently for acceptable noise reduction. Averaging a large number of frames at all intensity levels may minimize the noise. However, increasing the number of frames to be averaged is computationally expensive. Therefore, it is desirable to average only the number of frames that is required to minimize noise to an acceptable level.

The acceptable level of noise (Os acceptable, desired, or target standard deviation) may depend upon the application. In some embodiments, an acceptable value of noise may be the lowest amount of noise in an image. For example, with reference to FIG. 3, in some embodiments, the acceptable level of noise may be the noise, or the standard deviation, of the response at intensity A (that is, $\sigma_A$). In such an embodiment, it may be desirable to average as many number of frames at intensity B to reduce the standard deviation of the response at intensity B to about $\sigma_A$. Decreasing the standard deviation of the response at intensity B to be approximately the same as the standard deviation, of the response at intensity A will make the noise level at both locations to be about the same. In some embodiments, the acceptable level of noise may be based on standard deviation of the response of the pixel with the lowest level of illumination (that is, lowest DN output). Since the noise associated with a dark image is low, selecting the noise level associated with the darkest pixel as the acceptable standard deviation of noise makes the noise all illumination s in an image to be the least. In some embodiments, the acceptable value of noise may be selected to be the smallest change that can be detected by a pixel. Since 2°, or 1 DN, is the smallest digital number that can output by a pixel or its associated electronics, a change in response of less than 1 DN cannot be recognized by the control system 150. Therefore, in some embodiments, the acceptable level of noise may be considered to be 1 DN.

In some embodiments of the current disclosure, the control system 150 may determine the number of frames to be averaged at an intensity level to reduce the standard deviation of the response to target value (that is, reduce the noise to the acceptable level). In some embodiments, the control system 150 may use an algorithm that computes the number of frames "n" to be averaged at any particular light intensity using equation 1 below:

$$n = \text{ceil}\left(\frac{\sigma_{actual}}{\sigma_{target}}\right)^2 \quad (1)$$

where $\sigma_{target}$ is the desired or the target standard deviation value, and $\sigma_{actual}$ is the actual standard deviation of the response at that particular light intensity. Ceil is a ceiling function that rounds the result of the calculation, for example, A, to the nearest integer greater than or equal to A. That is, if the standard deviation or the scatter of pixel 122 at any given light intensity is known, equation 1 provides the number of frames that will ha be averaged to attain a response having a target standard deviation (or scatter level). The number or frames "n" may vary with the intensity of illumination. In general, since the standard deviation of the response increases with light intensity, more frames may need to be averaged at higher light intensities to obtain the same target standard deviation as a response at a lower light intensity.

The standard deviation of pixel 122 at any intensity ($\sigma_{actual}$) may be determined based on experimentation or may be otherwise known apriori. In some embodiments, the standard deviations of each pixel at different light intensities may be stored in a database in memory 114 of control system 150. In some embodiments, memory 114 may maintain a database of "n" values for each pixel of light sensor 104 at different intensities. And, based on the observed response of each pixel in an application, the control system 104 may determine, Me, or obtain from the database, the number of frames "n" that will need to be averaged to reduce the noise to the acceptable standard deviation ($\sigma_{target}$). Based on this information, the processor 112 of the control system 120 may be configured to average the required number of frames to reduce the noise to the acceptable level. In some embodiments, the database may store the "n" values of each pixel at several desired standard deviation values ($\sigma_{target}$). In such embodiments, a user may select the $\sigma_{target}$ value to use in an application, and the control system may choose a value of "n" that corresponds to the observed intensity and the user selected $\sigma_{target}$ value.

In embodiments where image sensor 104 includes several million pixels, the computational burden of averaging several frames of each pixel may be high. Therefore, in some embodiments, control system 150 may be configured to reduce the computational burden of the processor 112 during noise reduction. Control system 150 may use any approach to reduce computational burden. In some embodiments, where several pixels of image sensor 104 behave similar manner, the control system 150 may associate the same "n" or $\sigma_{actual}$ values to groups of pixels to ease computational requirements. These groups of pixels (that are assumed by the control system 150 to behave similarly) may be preselected or may be selected by a user based on the application. For example, in an application of endoscope 100 (or another device that includes image sensor 104) where computational speed is more important than image fidelity, a user may prompt the control system 150 to treat pixels that have incident intensities (or standard deviations at a particular intensity) within a certain range to be similar to ease the computational burden.

In some embodiments, the control system 150 may also employ other methods to ease the computational burden of processor 112. For instance, it is known that binary division is a computationally intensive process. Therefore, an averaging operation (that includes adding "n" number of frames together and dividing the result by "n") is a computationally intensive process. However, binary division where the divisor is a power of two is relatively trivial. This is because, in binary arithmetic, division by two can be performed by a bit shift operation. Therefore, in some embodiments, the control system may round the number of frames "n" to be averaged at any particular intensity up to the closest higher power of two. The control system 150 may round "n" to the closest higher power of 2 using any method known in the art. In some embodiments, the controller may round "n" to the closest higher power of 2 using equation 2 below:

$$n^* = 2^{\{ceil[\log_2(n)]\}} \quad (2)$$

where n* is the number of frames to be averaged at any intensity rounded up to the closest higher power of two (such as, for example $2^0=1$, $2^1=2$, $2^2=4$, $2^3=8$, $2^4=16$, etc.). For example, in embodiments where the number of frames to be averaged "n" is computed as 7, rounding up the number of frames to be averaged to the closest higher power of two will result in 8. And, in embodiments, where the computed value of n is 4, rounding up the number of frames to be averaged to the closest higher power of two (n*) will result in 4. It should be noted that equation 2 is exemplary only, and control system 150 may round the number of frames to be averaged to the closest higher power of 2 by any means, including using another algorithm or equation.

In some embodiments, the control system 150 may compute and store the number of frames "n" to be averaged at different intensities to yield a target standard deviation value of 1 DN (that is, the scatter of the pixel response is less than or equal to one digital number) using equation 3 below:

$$n^* = \text{ceil}(\sigma_{actual}^2) \quad (3)$$

In some embodiments, the control system 150 may compute and store n*, the timber of frames to be averaged at any intensity rounded up to the closest higher power of two, using equation 4 below:

$$n^* = 2\{(\text{ceil}[\log_2(\text{ceil}(\sigma_{actual}^2))])\} \quad (4)$$

Figure 4:
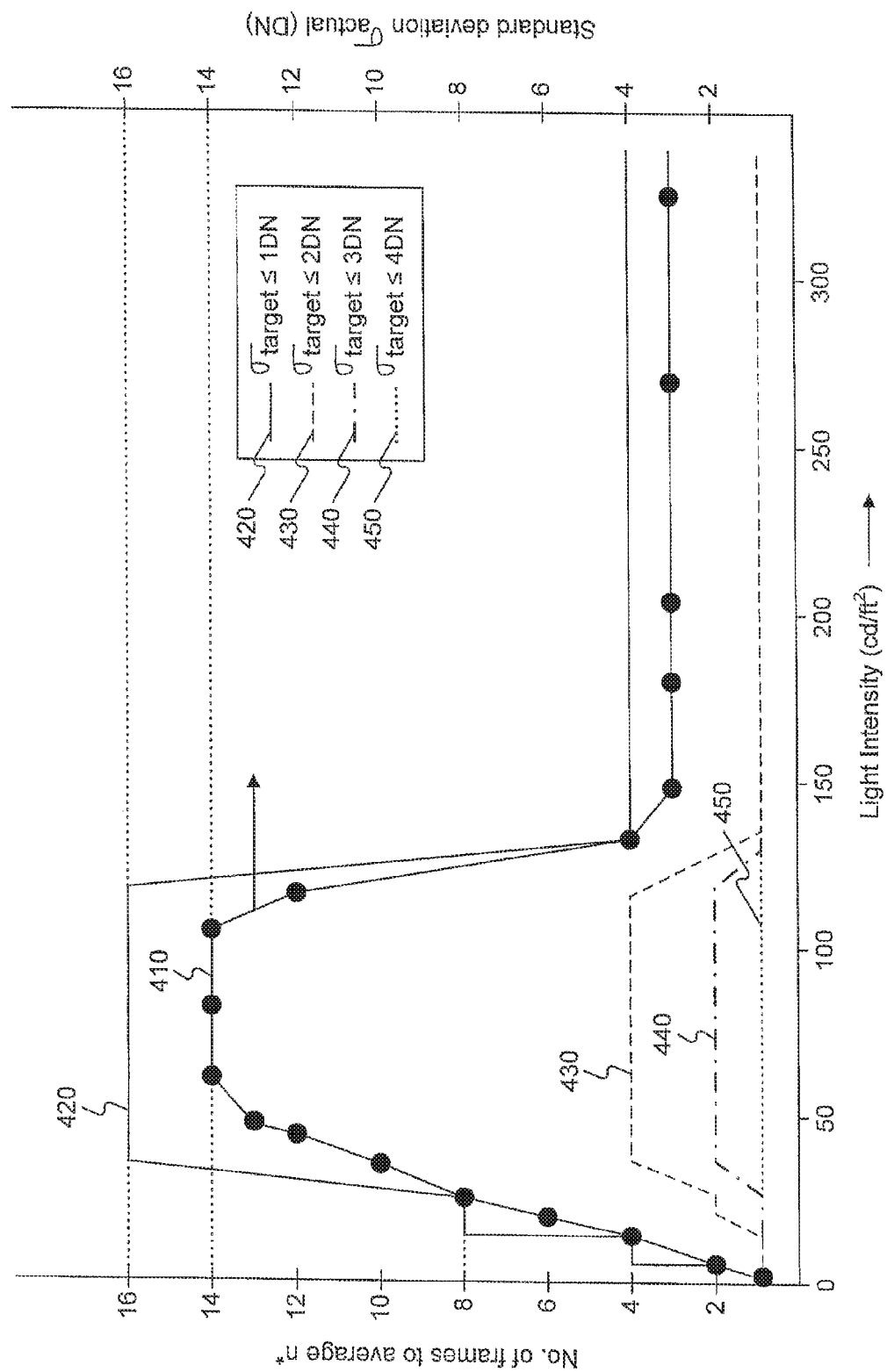
FIG. 4 is an exemplary illustration, of the variation of the number of frames of a pixel to be averaged, as a function of incident light intensity, for a response with a desired noise level.

And, based on the observed response of each pixel in an application, the control system 150 may determine the number of frames, n or n*, to minimize noise FIG. 4 is a graph that illustrates the actual standard deviation $\sigma_{actual}$ 410 of a pixel 122 as a function of light intensity in an exemplary application. For example, FIG. 4 shows that the observed $\sigma_{actual}$ 410 of pixel 122 at a light intensity of about 20 cd/ft² about 4 DN, and the $\sigma_{actual}$ 410 at about 75 cd/ft² is about 14 DN. It should be noted that the decrease in observed $\sigma_{actual}$ values at intensities above about 100 cd/ft² is an artifact of the testing. This trend was observed because of signal clipping (that is, in FIG. 4, an intensity of about 100 cd/ft² produced the maximum digital response ($2^8$ for an 8 bit IC device) and higher values of intensity produced this same response). FIG. 4 also includes curves 420, 430, 440, 450 that indicate the number of frames that will have to be averaged at different intensities, rounded up to the closest higher power of two, (n*) to reduce the noise to within different target standard deviations ($\sigma_{target}$). For example, based on FIG. 4, to reduce the noise to a $\sigma_{target}$ of within 1 DN at a light intensity of 50 cd/ft², 16 frames will have to be averaged. However, to reduce the noise to a $\sigma_{target}$ of within 3 DN, only 2 frames will have to be averaged. Curves (or data) similar to that illustrated in FIG. 4 may be used by control system 150 to dynamically calculate n* (or "n") to calibrate an endoscopic image sensor 104. For example, if a range of intensity values for a particular endoscopic image sensor 104 changes, the relationships in FIG. 4 may be used to select an appropriate value of n* for calibrating the pixels of the image sensor in response to the change. The control system 150 may also select the number of times to average a response of a pixel at a particular intensity based on the amount of noise that can be tolerated in an image.

The embodiments described herein are exemplary only, and it will be apparent to those skilled in the art that various modifications and variations can be made in the disclosed systems and processes without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims.

We claim:

1. A method of calibrating a plurality of pixels of an image sensor with a processor and a memory, the method comprising:

calibrating, by the processor, a first pixel of the image sensor, the calibrating the first pixel including:

detecting a first response from the first pixel of the image sensor as a result of light generated by a light source and having an intensity impinging on the first pixel;

receiving an actual standard deviation of the first response of the first pixel at the intensity of light;

determining a first averaging number for the first pixel at the intensity, the first averaging number being a number of responses of the first pixel at the intensity to be averaged to attain an average first response having a first standard deviation less than or equal to a first target value stored by the memory; and determining the average first response of the first pixel using the determined first averaging number;

calibrating, by the processor, a second pixel of the image sensor, the calibrating the second pixel including:

detecting a second response from the second pixel of the image sensor as a result of light having an intensity generated by the light source impinging on the second pixel;

receiving an actual standard deviation of the second response of the second pixel at the intensity of light;

determining a second averaging number for the second pixel at the intensity, the second averaging number being a number of responses of the second pixel at the intensity to be averaged to attain an average second response having a standard deviation less than or equal to a second target value stored by the memory; and determining the average second response of the second pixel using the determined second averaging number;

wherein calibrating the first pixel is done independently of calibrating the second pixel.

2. The method of claim 1, wherein receiving the actual standard deviation of the first response includes determining the actual standard deviation of the first response of the first pixel at multiple intensities of incident light and recording the determined actual standard deviations of the first response.

3. The method of claim 1, wherein determining the first averaging number includes determining the first averaging number using the equation:

$$n = \text{ceil}\left(\frac{\sigma_{actual}}{\sigma_{target}}\right)^2,$$

where n=the first averaging number, $\sigma_{actual}$=the actual standard deviation of the first response at the intensity, $\sigma_{target}$=the first target value of standard deviation, and ceil is a ceiling function that rounds a result of $(\sigma_{actual}/\sigma_{target})^2$ to the next integer greater than or equal to the result.

4. The method of claim 3, wherein determining the second averaging number includes determining the second averaging number using the equation:

$$n = \text{ceil}\left(\frac{\sigma_{actual}}{\sigma_{target}}\right)^2,$$

where n=the second averaging number, $\sigma_{actual}$=the actual standard deviation of the second response at the intensity, $\sigma_{target}$=the second target value of standard deviation, and ceil is a ceiling function that rounds a result of $(\sigma_{actual}/\sigma_{target})^2$ to the next integer greater than or equal to the result.

5. The method of claim 1, wherein determining the first averaging number includes rounding the determined first averaging number to the closest higher power of two.

6. The method of claim 5, wherein determining the second averaging number includes rounding the determined second averaging number to the closest higher power of two.

7. The method of claim 1, wherein the first target value is 1 bit.

8. The method of claim 7, wherein the second target value is 1 bit.

9. A method of calibrating an image sensor with a processor and a memory, the method comprising:
   detecting a response from a pixel of the image sensor as a result of light generated by a light source and having an intensity impinging on the pixel;
   receiving, by the processor, an actual standard deviation of the response of the pixel at the intensity of light;
   determining, by the processor, an averaging number for the pixel at the intensity, the averaging number being a number of responses of the pixel at the intensity to be averaged to attain an average response having a standard deviation less than or equal to a target value stored by the memory; and
   determining, by the processor, the average response of the pixel using the determined averaging number; and
   wherein determining the actual standard deviation includes individually determining the actual standard deviation for each pixel of multiple pixels of the image sensor at multiple intensities of incident light and recording the determined actual standard deviations.

10. The method of claim 9, wherein receiving the actual standard deviation includes determining the actual standard deviation of the response of the pixel at multiple intensities of incident light and recording the determined actual standard deviations.

11. The method of claim 9, wherein determining the averaging number includes individually determining an averaging number for each of the multiple pixels, the averaging number for each pixel of the multiple pixels being the number of the responses of the pixel to be averaged to attain an average response for the pixel at the intensity of light incident on the pixel.

12. The method of claim 9, wherein determining the averaging number includes determining the averaging number using the equation:

$$n = \text{ceil}\left(\frac{\sigma_{actual}}{\sigma_{target}}\right)^2,$$

where n=the averaging number, $\sigma_{actual}$=the actual standard deviation at the intensity, $\sigma_{target}$=the target value of standard deviation, and ceil is a ceiling function that rounds a result of $(\sigma_{actual}/\sigma_{target})^2$ to the next integer greater than or equal to the result.

13. The method of claim 9, wherein determining the averaging number includes rounding the determined averaging number to the closest higher power of two.

14. The method of claim 13, wherein the rounding includes rounding the determined averaging number using the equation $n^* = 2^{\{ceil[\log_2(n)]\}}$, where $n^*$=the averaging number rounded to the closest higher power of two, n=the determined averaging number, and ceil is a ceiling function that rounds a result of the calculation to the next integer greater than or equal to the result.

15. The method of claim 9, wherein the target value of standard deviation is the actual standard deviation of a pixel of the image sensor having a lowest value of response.

16. The method of claim 9, wherein the target value is 1 bit.

17. A method of operating an image sensor with a processor and a memory, the method comprising:
   detecting a response from a pixel of the image sensor as a result of light generated by a light source and having a first intensity impinging on the pixel;
   obtaining, by the processor, an actual standard deviation of the response of the pixel at the first intensity, the actual standard deviation being a number indicative of an expected variation in the response of the pixel;
   determining, by the processor, a number n at the first intensity, wherein the number n is the number of frames at the first intensity to be averaged to attain a target standard deviation stored by the memory for the response at the first intensity; and
   averaging, by the processor, n number of responses from the pixel at the first intensity to obtain an average response from the pixel at the first intensity; and
   repeating the detecting, obtaining, determining, and averaging steps for each pixel of the image sensor individually of one another.

18. The method of claim 17, wherein obtaining the actual standard deviation includes receiving the actual standard deviation from the memory.

19. The method of claim 17, wherein detecting the response includes detecting the response from the image sensor of an endoscope.

* * * * *